(12) United States Patent
Kunitani et al.

(10) Patent No.: US 7,047,749 B2
(45) Date of Patent: May 23, 2006

(54) REGENERATIVE REFRIGERATING APPARATUS

(75) Inventors: Shingo Kunitani, Sakai (JP); Atsushi Miyamoto, Sakai (JP); Daisuke Sanjou, Sakai (JP); Yasuhiro Kakimi, Sakai (JP); Taketoshi Watanabe, Sakai (JP)

(73) Assignee: Air Water Inc., Hokkaido (JP)

( * ) Notice: Subject to any disclaimer, the term of this patent is extended or adjusted under 35 U.S.C. 154(b) by 0 days.

(21) Appl. No.: 10/480,212

(22) PCT Filed: Jun. 20, 2002

(86) PCT No.: PCT/JP02/06192

§ 371 (c)(1),
(2), (4) Date: Dec. 10, 2003

(87) PCT Pub. No.: WO03/001127

PCT Pub. Date: Jan. 3, 2003

(65) Prior Publication Data

US 2004/0168445 A1    Sep. 2, 2004

(30) Foreign Application Priority Data

Jun. 21, 2001   (JP)   ............................... 2001-188109

(51) Int. Cl.
*F25B 9/00*   (2006.01)
(52) U.S. Cl. ............................................................ 62/6
(58) Field of Classification Search .................. 62/6, 62/259.2
See application file for complete search history.

(56) References Cited

U.S. PATENT DOCUMENTS

| | | | | |
|---|---|---|---|---|
| 4,679,401 A | * | 7/1987 | Lessard et al. | 62/55.5 |
| 5,519,999 A | * | 5/1996 | Harpole et al. | 62/6 |
| 6,112,527 A | * | 9/2000 | Steinmeyer et al. | 62/6 |
| 6,205,812 B1 | * | 3/2001 | Acharya et al. | 62/607 |
| 6,230,499 B1 | * | 5/2001 | Hohne | 62/6 |
| 6,332,925 B1 | * | 12/2001 | Noji et al. | 118/715 |
| 6,343,475 B1 | * | 2/2002 | Ishikawa | 62/6 |

FOREIGN PATENT DOCUMENTS

| | | |
|---|---|---|
| JP | 01-139959 | 6/1989 |
| JP | 03-236551 | 10/1991 |
| JP | 4-224659 | 8/1992 |
| JP | 08-313084 | 11/1996 |

* cited by examiner

*Primary Examiner*—William C. Doerrler
(74) *Attorney, Agent, or Firm*—Clark & Brody

(57) ABSTRACT

A regenerative refrigerating apparatus which can increase the speed of cooling and heating a subject to be cooled. The specific constitution of the regenerating type refrigerating apparatus includes a pressure control means 4 having a compressor 4a, a high pressure selector valve 4b, and a low pressure selector valve 4c, an expanding/compressing unit 1 having a room temperature end 1a and a low temperature end 1b, and a regenerating unit 2 having a room temperature end 2a and a low temperature end 2b, carries out heat transfer to a subject to be cooled, and is comprised of a flow path for working gas connecting the low temperature end 1b of the expanding/compressing unit and the low temperature end 2b of the regenerating unit with each other, and simultaneously extending to the subject to be cooled 7. Consequently, it is possible to significantly increase the utilization ratio of the refrigerating apparatus, and to widely apply the refrigerating apparatus to sensors and semiconductor manufacturing apparatuses.

1 Claim, 8 Drawing Sheets

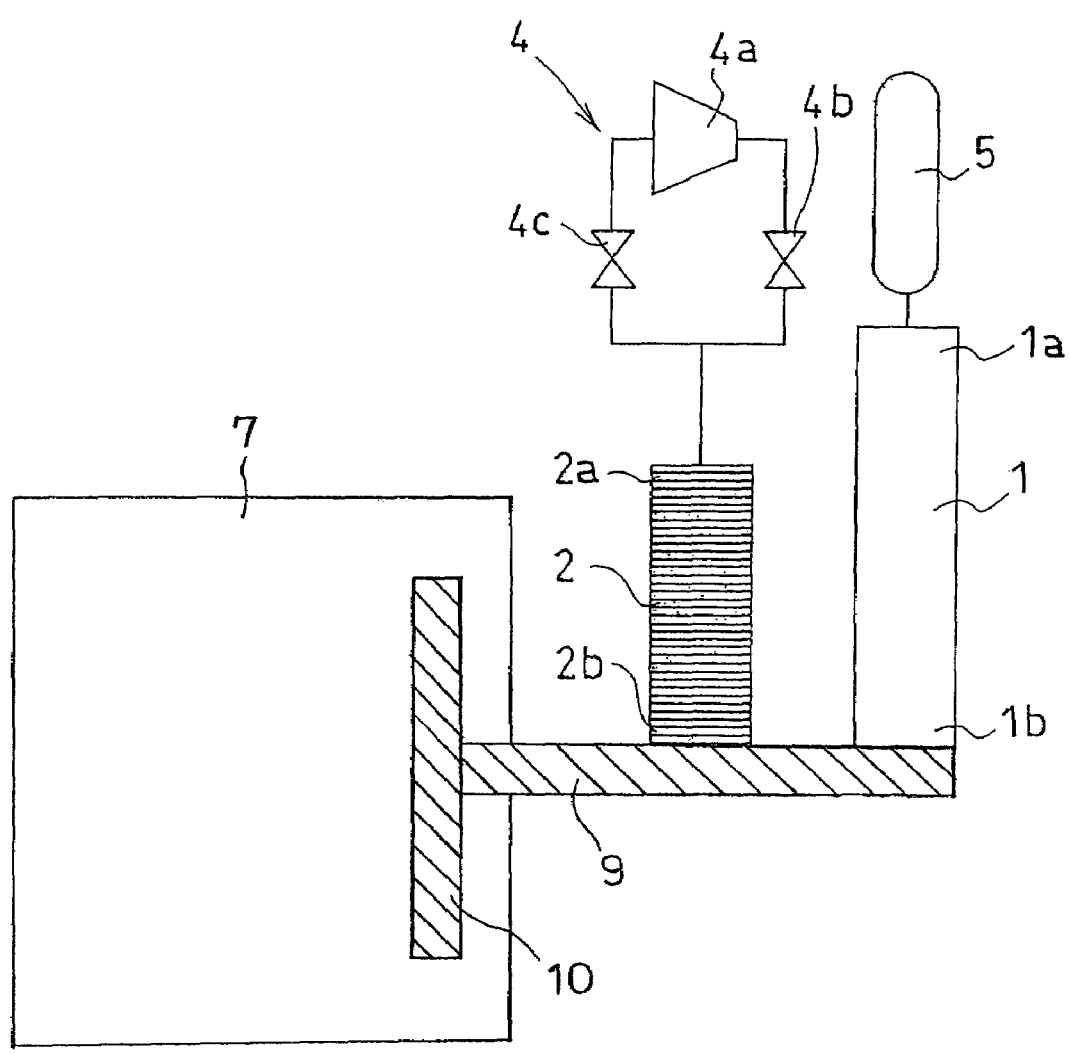
F I G. 5

F I G. 6
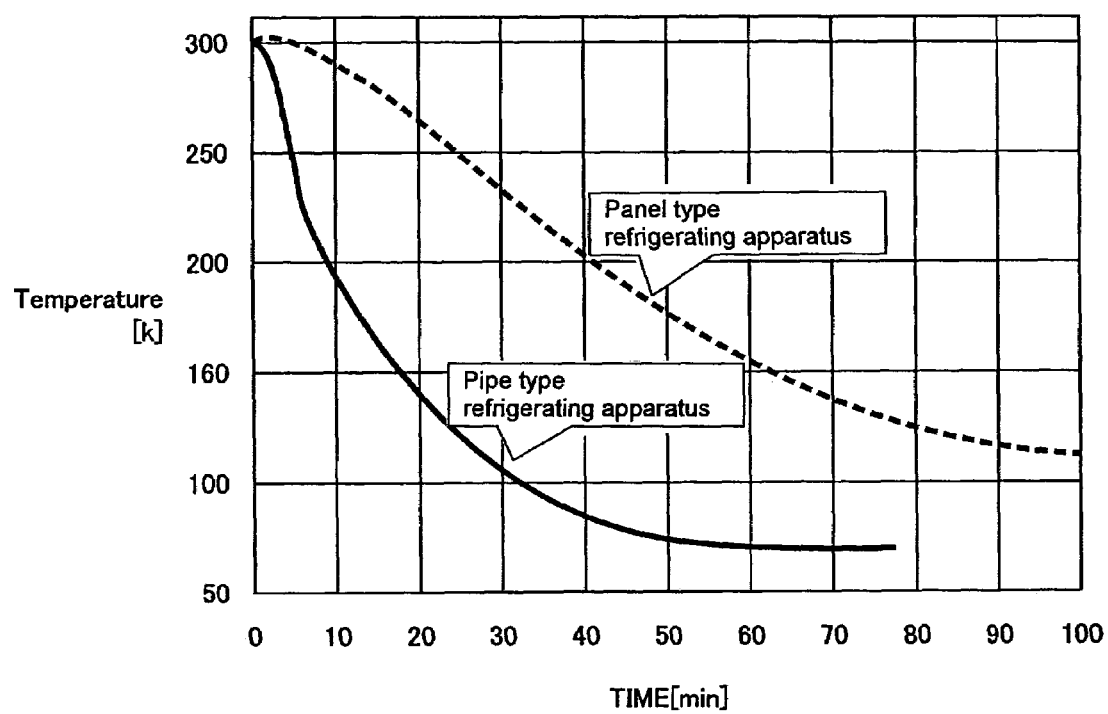

REGENERATIVE REFRIGERATING APPARATUS

TECHNICAL FIELD

The present invention relates to a regenerative refrigerating apparatus intended for application to a GM refrigerating apparatus and a pulse tube refrigerating apparatus, and specifically to a regenerative refrigerating apparatus which can cool and heat/regenerate a subject to be cooled efficiently.

BACKGROUND ART

As regenerative refrigerating apparatus used as a compact and cryogenic refrigerating apparatus, refrigerating apparatuses presenting various levels of the performance have been developed up to now, and the regenerative refrigerating apparatus has development history exemplified by a Stirling refrigerating apparatus, a GM refrigerating apparatus, and further, a pulse tube refrigerating apparatus. All of these refrigerating apparatuses employ a method of compressing and expanding working gas serving as refrigerant in the apparatus, thereby generating cool and heat, and the GM refrigerating apparatus and the pulse tube refrigerating apparatus have been generally used recently.

Particularly, since the pulse tube refrigerating apparatus has a simple structure which does not have a moving part in a low temperature section as shown in FIG. 2 described later, it hardly generates vibration at the low temperature section, and thus presents a high reliability for a long term operation. Further, since maintenance-free may be expected for the operation of the pulse tube refrigerating apparatus, the pulse tube refrigerating apparatus plays an important role as cooling means for sensors and semiconductor manufacturing apparatuses.

FIG. 1 shows a schematic diagram describing the basic constitution and operation principle of the GM refrigerating apparatus. In an expanding/compressing unit 1, a displacer 1c is provided as an expansion piston, and the displacer 1c is constituted so as to be reciprocated by a stepping motor during the operation. A room temperature end 1a is disposed at the top end of the expanding/compressing unit 1, and a low temperature end 1b is disposed at the bottom end on the opposite side. Similarly, a regenerating unit 2 is constituted as a cylindrical tube body including a room temperature end 2a at the top end, and a low temperature end 2b at the bottom end, and is filled with a stacked regenerating material such as stainless steel mesh inside. Further, a connecting tube 3 is provided between the low temperature end 1b of the expanding/compressing unit 1 and the low temperature end 2b of the regenerating unit 2 for connecting them with each other.

Pressure control means 4 is comprised of a compressor 4a, a high pressure selector valve 4b, and a low pressure selector valve 4c, and the high pressure selector valve 4b, and the low pressure selector valve 4c are in synchronism with the movement of the displacer 1c. When the displacer 1c is on the bottom end side of the expanding/compressing unit 1, the high pressure selector valve 4b opens, and high pressure working gas flows into a top space of the displacer 1c. Then, when the displacer 1c moves up to the room temperature end 1a, the high pressure gas in the top space moves to a bottom space while the gas is being cooled passing through the regenerating unit 2. In this state, since the bottom section is at a low temperature, the gas contracts, and the high pressure working gas is supplied from the high pressure selector valve 4b. When the displacer 1c moves to the top end side, the high pressure selector valve 4b closes, and the low pressure selector valve 4c opens to discharge the high pressure gas in the low temperature space. As a result, the gas expands adiabatically, and thus, cool is obtained in the bottom space at the low temperature end 1b. When the displacer 1c goes down to the bottom end side while the low pressure selector valve 4c is open, the low temperature gas in the low temperature space absorbs refrigerating load, and moves to the top space while being heated passing through the regenerating unit 2, and remaining gas returns to and sucked by the pressure control means 4. When the displacer 1c goes down to the low temperature end 1b, the high pressure selector valve 4b opens, and high pressure working gas flows into the top space of the displacer 1c.

The cold obtained at the low temperature end 1b of the expanding/compressing unit 1 is heat-transferred to a subject to be cooled 7 through a cold head (cooling unit) 6 covering the low temperature end 2b of the regenerating unit 2 and the low temperature end 1b of the expanding/compressing unit 1. As described above, since the GM refrigerating apparatus has the structure presenting the reciprocating motion by the stepping motor, vibration tends to occur on the expanding/compressing unit 1, and the vibration may be transferred to the subject to be cooled 7 through the cold head 6 as a medium.

FIG. 2 shows a schematic diagram describing the basic constitution and operation principle of the pulse tube refrigerating apparatus. The pulse tube refrigerating apparatus is constituted by removing the displacer in the GM refrigerating apparatus, and is comprised of a single tube body, thus replacing working gas by phase difference. Consequently, the number of parts of the refrigerating apparatus is small, and the structure is simple.

As shown in the drawing, the pulse tube refrigerating apparatus is constituted as a pulse tube 1 including a room temperature end 1a at the top end, and a low temperature end 1b at the bottom end, and similarly, and a regenerator 2 including a room temperature end 2a at the top end, and a low temperature end 2b at the bottom end, and filled with a stacked regenerating material such as stainless steel mesh inside.

The pressure control means 4 communicating with the room temperature end 2a of the regenerator 2, and oscillating the pressure of working gas is comprised of a compressor 4a, a high pressure selector valve 4b and a low pressure selector valve 4c. The phase control means 5 which communicates with the room temperature end 1a of the pulse tube 1 so as to adjust the phase difference between the pressure fluctuation and the position fluctuation of the working gas in the refrigerating apparatus is usually provided with a buffer tank. When the refrigerating apparatus is operating, since the working gas in the apparatus and the working gas in the buffer tank communicate with each other, and the phase difference between the pressure fluctuation and the position fluctuation of the working gas is generated by a certain flow resistance, controlling this phase difference adiabatically expands the working gas in a neighborhood of the low temperature end 1b of the pulse tube 1 so as to generate cold.

The low temperature end 2b of the regenerator 2 and the low temperature end 1b of the pulse tube 1 are connected with each other by a connecting tube 3. The cold obtained by the low temperature end 1b of the pulse tube 1 is heat-transferred to a subject to be cooled 7 through a cold head 6 covering the low temperature end 2b of the regenerator 2 and the low temperature end 1*b* of the pulse tube 1 as in the case of the GM refrigerating apparatus.

As shown in FIGS. 1 and 2, the cooling in the conventional GM refrigerating apparatus and pulse tube refrigerating apparatus is structured such that the cold head covering the cold generating section is provided, and is brought in contact with the subject to be cooled to transfer the cold. As a result, the cold head uniformly constituted with copper having high heat conductivity is employed for causing efficient heat transfer.

DISCLOSURE OF THE INVENTION

Utilizing heat in the regenerative refrigerating apparatus includes a cold trap process using a cryopump, cooling process for a gas condenser, and cryogenic refrigerating for superconducting devices and sensors. For example, in the process using the cryopump, high vacuum can be reached while the cold trap is attained by causing an attaching panel mounted on the cold head of the refrigerating apparatus to attach gas molecules. For this purpose, it is necessary to transfer the cold generated by the refrigerating apparatus to a predetermined section to be cooled quickly and efficiently without loss.

On the other hand, in the process using the cryopump described above, when the gas molecules in more than a certain quantity are attached on the attaching panel, and a gas molecule layer becomes thicker, since the performance decreases, it is necessary to heat the attaching panel so as to release the attached gas molecules to the outside. In addition, when the regenerative refrigerating apparatus is used for cryogenic refrigerating for super conducting elements and sensors, heating/regeneration is always necessary as post processing of the cooling. In order to heat/regenerate the subject to be cooled in this way, a heater is attached to the cold head so as to heat, or room temperature gas is introduced into the refrigerating apparatus system so as to communicate the gas.

Therefore, as for utilizing heat in the regenerative refrigerating apparatus, efficient heat transfer by increasing the speed is required both in the cooling and heating/regenerating processes. If the heat transfer efficiency of the cold head so as to increase the heat transfer quantity were tried to increase in response to this need, it would be necessary to increase the sectional area of the cold head to increase the heat transfer area, and to decrease the heat transfer distance. However, if the shape of the cold head were limited in this way, the shape and position of applicable subjects to be cooled would be limited.

Especially, when the cold generated by the GM refrigerating apparatus were used, since the vibration generated in the refrigerating apparatus would be transferred to a subject to be cooled through the cold head, and there would be such problems as instrument precision would be affected in case of cooling sensors, and displacement of a wafer would occur during processing or transporting in case of a cold trap attached to a semiconductor apparatus.

The present invention has been accomplished in view of the foregoing situations, and has an objective of providing a regenerative refrigerating apparatus which can increase the speed of the cooling and heating/regenerating of a subject to be cooled, thereby enabling efficient heat transfer when the heat is utilized in the regenerative refrigerating apparatus, and simultaneously, preventing vibration generated in the refrigerating apparatus from being transferred to the subject to be cooled even when a GM refrigerating apparatus is used.

The present inventors have carried out various studies for solving the foregoing problems, and have found that when the path through which the working gas flows is extended to a subject to be cooled for the heat transfer as for utilizing heat in the regenerative type refrigerating apparatus, the speed of cooling and heating/regenerating can increase, and thus, enhancement in the efficiency of the heat transfer can be attained.

In other words, efficient movement of the heat energy is attained by providing the flow path for the working gas at low temperature as far as to a subject to be cooled or its neighborhood, and directly flowing the working gas in place of the solid object heat transfer using the cold head for the heat transfer from the cold generating section of the refrigerating apparatus to the subject to be cooled.

The present invention has been completed based on the above finding, and the gist of the invention is the followings (1) a regenerative refrigerating apparatus, and (2) a pulse tube refrigerating apparatus as a type of the regenerative refrigerating apparatus.

(1) A regenerative refrigerating apparatus includes pressure control means having a compressor, a high pressure selector valve, and a low pressure selector valve, an expanding/compressing unit having a room temperature end and a low temperature end on both ends, and a regenerating unit having a room temperature end and a low temperature end on both ends, thereby carrying out heat transfer to a subject to be cooled, and the apparatus is characterized by comprising a flow path for working gas connecting the low temperature end of the expanding/compressing unit and the low temperature end of the regenerating unit with each other, and simultaneously extending to the subject to be cooled.

(2) A pulse tube refrigerating apparatus includes a pulse tube having a room temperature end and a low temperature end on both ends, a regenerator having a room temperature end and a low temperature end on both ends, phase control means for communicating with the room temperature end of the pulse tube so as to control pressure fluctuation and phase difference of working gas, and a pressure control means communicating with the room temperature end of the regenerator, and having a compressor, a high pressure selector valve, and a low pressure selector valve, thereby carrying out heat transfer to a subject to be cooled, the apparatus is characterized by comprising a flow path connecting the low temperature end of the pulse tube and the low temperature end of the regenerator with each other, and simultaneously, extending to the subject to be cooled.

Note that the subject to be cooled in the present invention includes an object to be cooled, a space to be cooled and the like as indicated in FIG. 3 and FIG. 4 described later.

BRIEF DESCRIPTION OF THE DRAWINGS

FIG. 5 is a drawing showing a schematic constitution of a cold trap process employed in a comparative example;

FIG. 6 is a drawing comparing a pipe type refrigerating apparatus and a panel type refrigerating apparatus in transition of a cooling temperature along time passage during cooling.

BEST MODE FOR CARRYING OUT THE INVENTION

A regenerative refrigerating apparatus of the present invention is characterized by a flow path of working gas connecting a low temperature end of an expanding/compressing unit and a low temperature end of a regenerating unit with each other, and simultaneously, extending to a subject to be cooled. Consequently, since it is possible to directly flow cold generated by the refrigerating apparatus to the subject to be cooled in place of heat transfer using a conventional cold head uniformly constituted using copper, it is possible to efficiently move heat energy. That is to say the speed of cooling and heating/regenerating increases, and consequently, the utilization ratio of the regenerative refrigerating apparatus increases.

Figure 1:
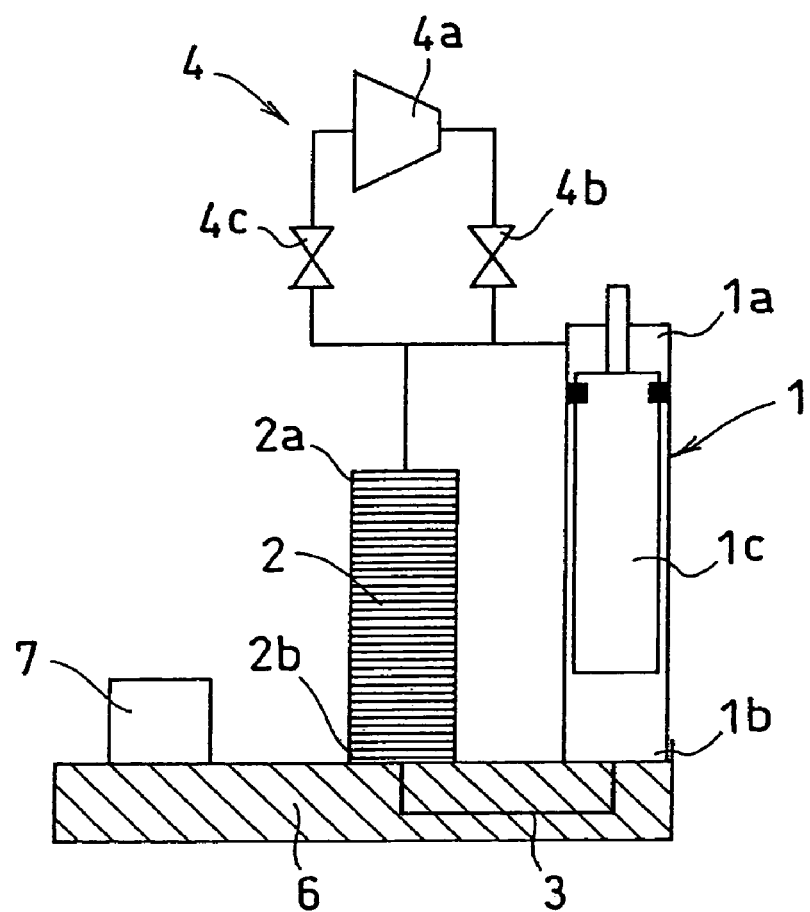
FIG. 1 shows a schematic diagram describing the basic constitution and operation principle of a GM refrigerating apparatus.
Figure 2:
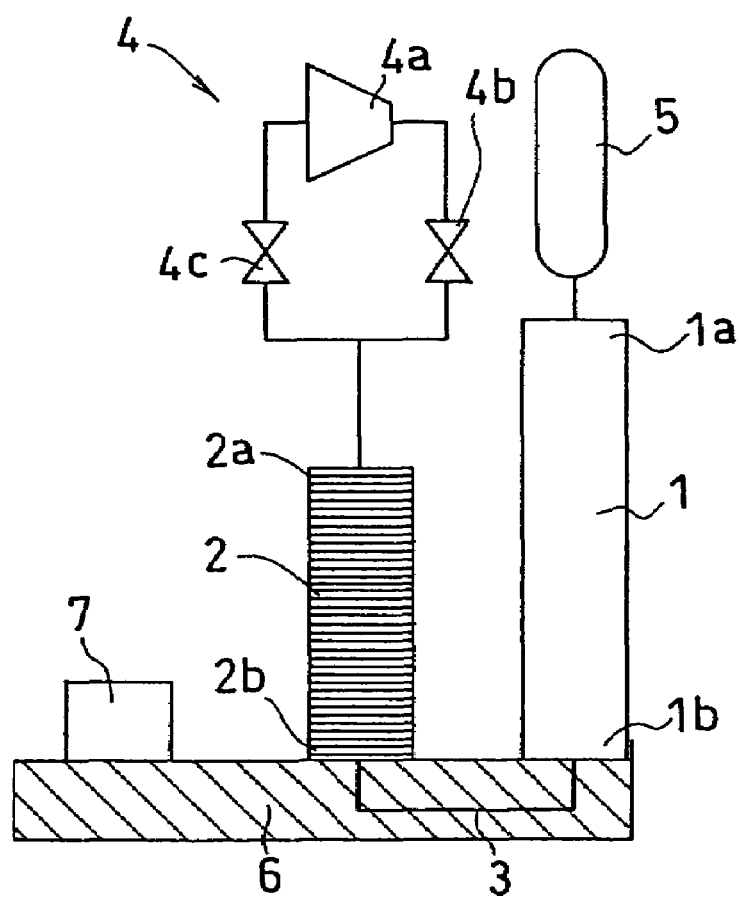
FIG. 2 shows a schematic diagram describing the basic constitution and operation principle of a pulse tube refrigerating apparatus.
Figure 3:
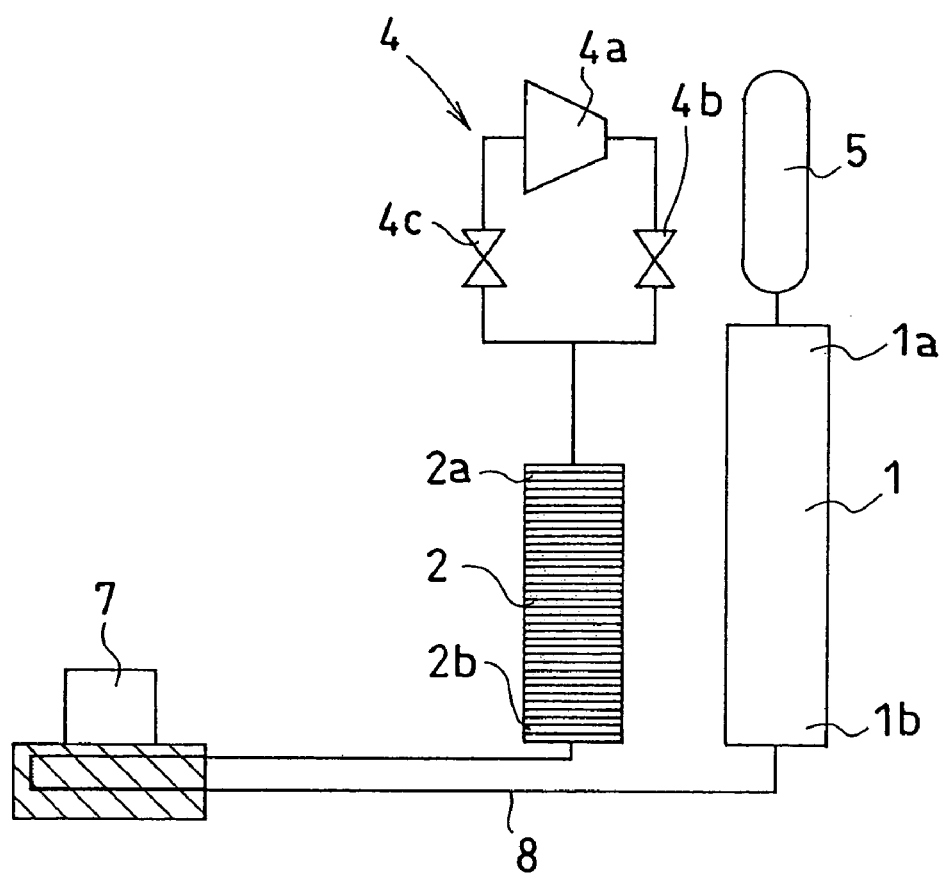
FIG. 3 is a drawing showing a constitution example of the pulse tube refrigerating apparatus applied to an object to be cooled as a type of the regenerative refrigerating apparatus of the present invention.
Figure 4:
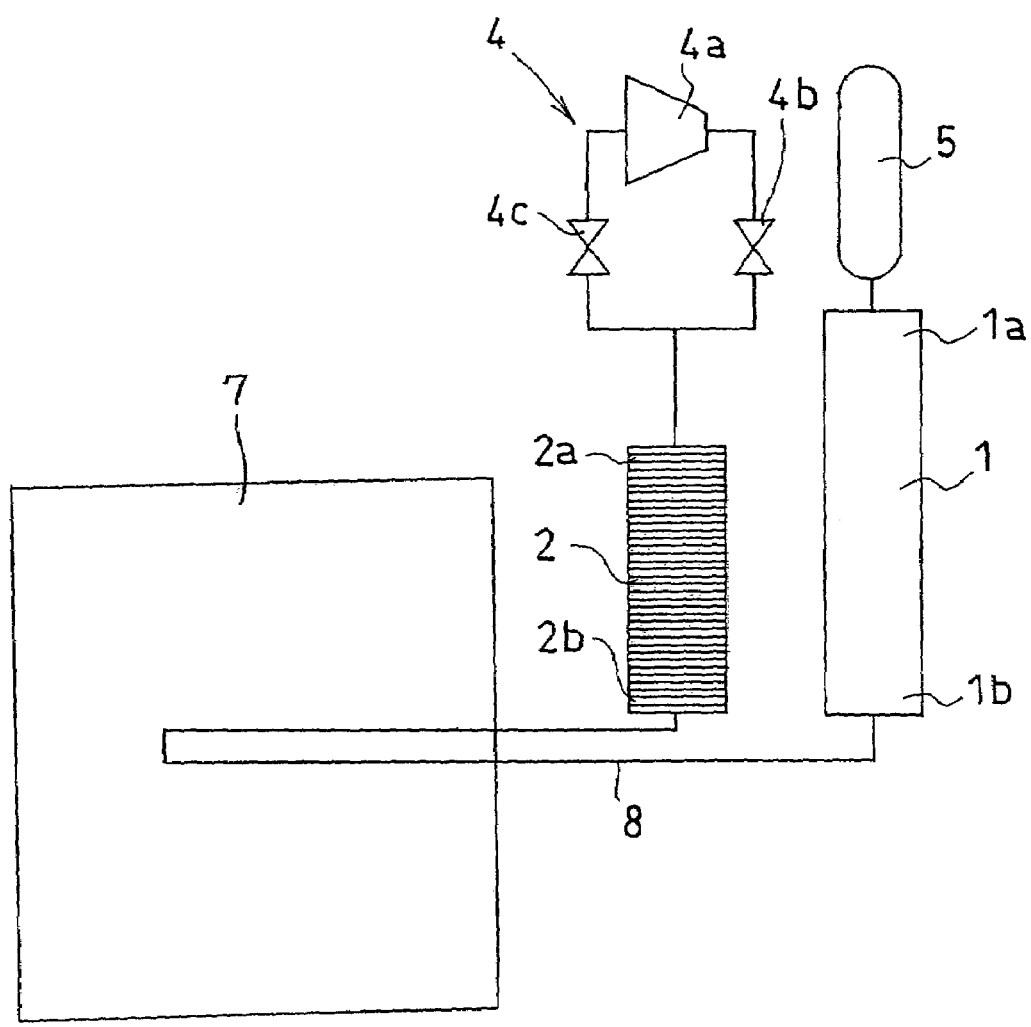
FIG. 4 is a drawing showing a constitution example of the pulse tube refrigerating apparatus applied to a space to be cooled as a type of the regenerative refrigerating apparatus of the present invention, and also showing a schematic constitution of a cold trap process employed in an example of the present invention in an application example.

FIG. 3 and FIG. 4 are drawings showing constitution examples of a pulse tube refrigerating apparatus as a type of the regenerative refrigerating apparatus according to the present invention. FIG. 3 shows a case where the subject to be cooled is an object to be cooled and FIG. 4 shows a case where the subject to be cooled is a space to be cooled.

Of the constitution shown in these drawings, a pulse tube 1 including a room temperature end 1a at the top end and a low temperature end 1b at the bottom end, a regenerator 2 including a room temperature end 2a at the top end and a low temperature end 2b at the bottom end, and containing a stacked regenerating material inside, pressure control means 4 communicating with the room temperature end 2a of the regenerator 2 and oscillating the pressure of working gas, and a phase control means 5 communicating with the room temperature end 1a of the pulse tube 1, and adjusting the phase difference between the pressure fluctuation and the position fluctuation of the working gas inside the refrigerating apparatus system are similar to those in a conventional pulse tube refrigerating apparatus.

The pulse tube refrigerating apparatus of the present invention is provided with a pipe 8 serving as a flow path of the working gas which connects the low temperature end 1b of the pulse tube 1 and the low temperature end 2b of the regenerator 2, and simultaneously extending to the subject to be cooled 7. Since as a result of providing the flow pipe 8 for the working gas extending to the subject to be cooled 7 in this way, the working gas with cold directly flows to the subject to be cooled, and transfers cold to the subject to be cold 7, the speed of the cooling can increase.

Figure 3A:
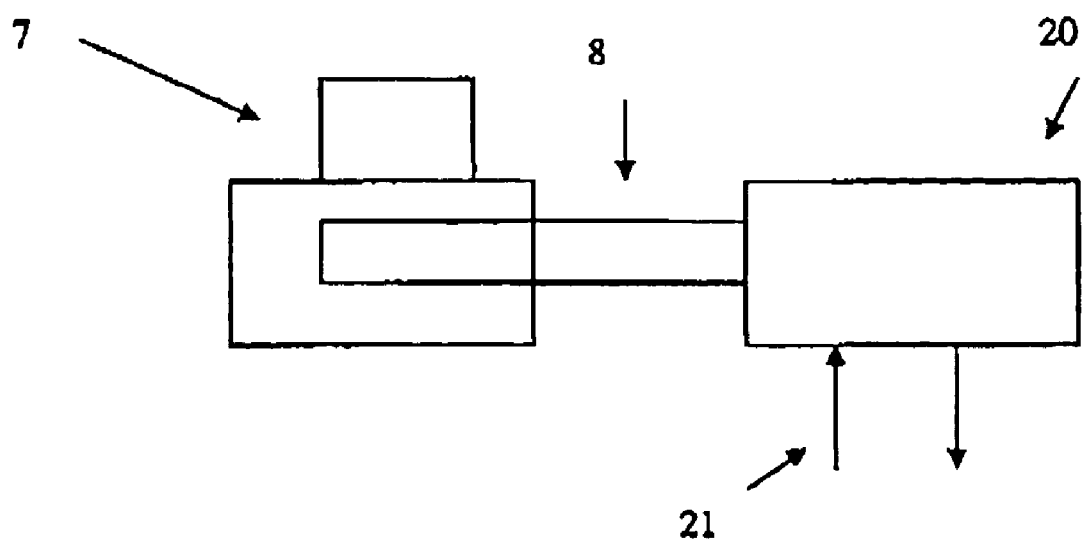
FIG. 3A is a schematic diagram showing another embodiment related to FIG. 3.

With reference to FIGS. 3 and 3A, when the subject to be cooled is heated/regenerated, gas 21 at a mom temperature is introduced into the system from the outside of the refrigerating apparatus 20 for heating. With this constitution, the heating period of the subject to be cooled 7 can be also reduced. As a result, it is possible to significantly increase the utilization ratio of the refrigerating apparatus during the cooling and heating/regenerating.

While FIG. 3 and FIG. 4 described above show the constitution examples for the pulse tube refrigerating apparatus as a type of the regenerative refrigerating apparatus, a Stirling refrigerating apparatus and a GM refrigerating apparatus can be applied. When the constitution is applied to the Stirling refrigerating apparatus or the GM refrigerating apparatus, there is such advantage that the vibration generated by the refrigerating apparatus is hardly transferred to a subject to be cooled.

The flow path of the working gas employed in the present invention is not limited to piping in a simple tube shape, and the sectional shape of the piping may include a circle, an ellipse, a rectangle, and other shapes which allow the flow of working gas. Additionally, in order to increase the heat transfer efficiency by the working gas, a fin in a lattice shape or in a radial pattern may be provided on the internal or the external surface of the piping. The material of the piping, the fin and the like may be aluminum, copper, stainless steel and the like. Note that when the piping is exposed to the atmosphere, it is necessary to cover the exposed part with a heat insulating material.

As the working gas for refrigerating, helium gas and nitrogen gas, which are usually used for the regenerative refrigerating apparatus, can be used.

It is preferable to employ the pulse tube refrigerating apparatus as the regenerative refrigerating apparatus according to the present invention. As described above, since an expansion piston (displacer) which slides during operation is not present, the structure of the apparatus is simple, and maintenance-free is thus realized. In addition, since microvibration is not generated, the apparatus does not adversely affect sensors and semiconductor manufacturing apparatuses.

EXAMPLES

To confirm the effect of the pulse tube refrigerating apparatus of the present invention, a cold trap process was carried out. As an example of the present invention, a pulse tube refrigerating apparatus using piping (referred to as a cryocoil herein after) in the flow path of working gas was employed, and a cold head type pulse tube refrigerating apparatus was used as a comparative example, and chronological transition in cooling and heating were compared during cooling and heating/regenerating. It was assumed to apply the refrigerating apparatuses to a vacuum pump which increases pumping capability by colleting moisture during vacuum pumping, and similar cooling areas for attaching the moisture was used for both of them.

FIG. 4 described above is a drawing showing a schematic constitution of the cold trap process employed in the present example of the invention. In the refrigerating apparatus which was used, the inner diameter and the length of the pulse tube were 50 mm and 300 mm respectively, the inner diameter and the length of the regenerating unit were 56.6 mm and 100 mm respectively, an active buffer was provided as the phase control apparatus, and the supply and exhaust of the refrigerant gas were carried out by a compressor and opening/closing of a rotary valve. Helium gas was used as the refrigerant gas. In the following example, the pulse tube refrigerating apparatus used as the example of the present invention is referred to as "pipe type refrigerating apparatus".

This pipe type refrigerating apparatus used a copper pipe with the outer diameter of 9.52 mm and the length of 8 m as the cryocoil. Further, refrigerating characteristic by the heater was confirmed, and the result showed that the apparatus had the refrigerating capability of 110 W at −133° C. (140K).

FIG. 5 is a drawing showing a schematic constitution of the cold trap process employed in the comparative example. In the refrigerating apparatus which was used, the inner diameter and the length of the pulse tube were 38 mm and 200 mm respectively, the inner diameter and the length of the regenerating unit were 54.8 mm and 93 mm respectively, and an active buffer was provided as the phase control apparatus. Nitrogen gas was used as the refrigerant gas, and the supply and exhaust of the refrigerant gas were carried out by a compressor and opening/closing of a rotary valve. In the following example, the pulse tube refrigerating apparatus used as the comparative example is referred to as "panel type refrigerating apparatus".

In this panel type refrigerating apparatus, as shown in FIG. 5, the heat transfer to a subject to be cooled 7 (vacuum container) is constituted by a cold link 9 comprised of a copper heat transfer block, and a cold panel 10 serving as a cooling surface. Further, refrigerating characteristic by the heater was confirmed, and the result showed that the apparatus had the refrigerating capability of 130 W at −133° C. (140K), which is slightly more excellent in the capability than the pipe type refrigerating apparatus described above.

FIG. 6 is a drawing comparing the pipe type refrigerating apparatus and the panel type refrigerating apparatus in transition of a cooling temperature along time passage during cooling. The temperatures shown in the drawing are the cryocoil surface temperature in case of the pipe type refrigerating apparatus, and the tip temperature of the cold panel in case of the panel type refrigerating apparatus. Note that difference in temperature scarcely occurred at any point on the cryociol.

While it took 20 minutes to cool down to −123° C. (150K) by the pipe type refrigerating apparatus, it took about 60 minutes by the panel type refrigerating apparatus.

Figure 7:
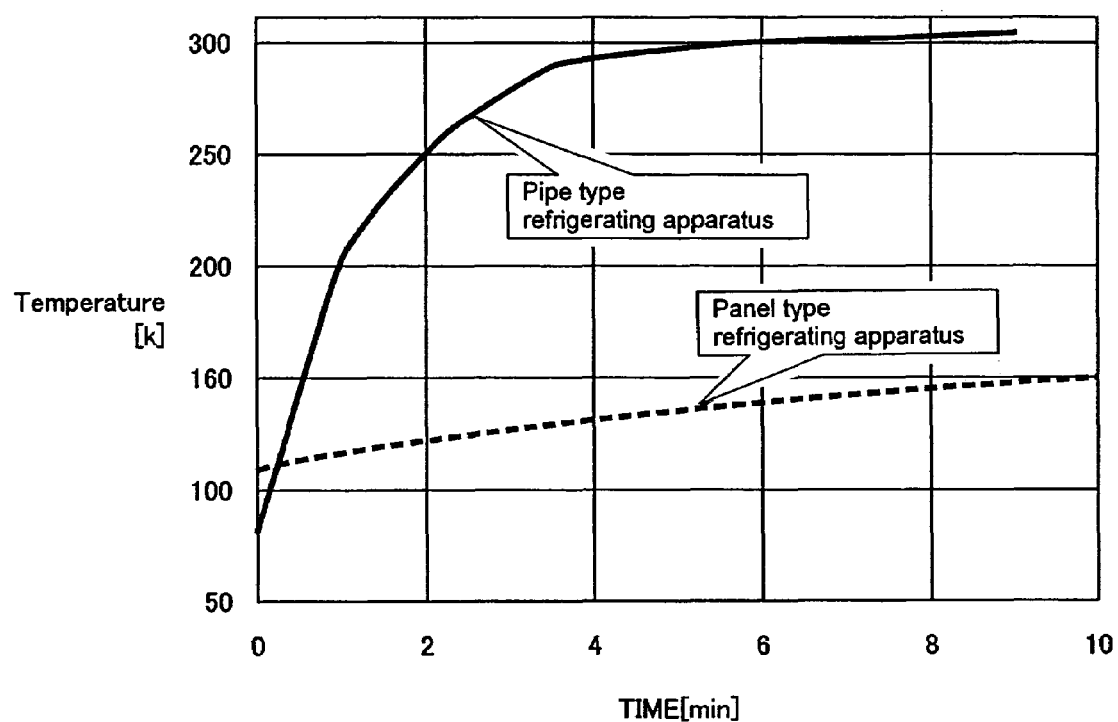
FIG. 7 is a drawing comparing the pipe type refrigerating apparatus and the panel type refrigerating apparatus in transition of a heating temperature along time passage during heating/regenerating.

FIG. 7 is a drawing comparing the pipe type refrigerating apparatus and the panel type refrigerating apparatus in transition of a heating temperature along time passage during heating/regenerating. The temperatures shown in the drawing are the same as those in FIG. 6.

While it took about 4 minutes to heat from −163° C. (110K) to 20° C. (293K) by the pipe type refrigerating apparatus, the temperature rose only by about 20° C. in four minutes by the panel type refrigerating apparatus. Though FIG. 7 does not show, it took about 240 minutes to heat from −163° C. (110K) to 20° C. (293K) by the panel type refrigerating apparatus.

The weight of the cryocoil of the pipe type refrigerating apparatus used in the present application example was 2 kg, and the weight of the cold panel and the cold link of the panel type refrigerating apparatus was 3 kg. Further, in consideration of the difference in cooling capability between them, the delay is permissible up to 1.27 times in cooling and heating by the panel type refrigerating apparatus. However, the delays confirmed in FIG. 6 and FIG. 7 exceed the permissible delay, and it is appreciated that the efficiency of the pipe type refrigerating apparatus of the example of the present invention is remarkable.

As described above, while the similar cooling areas were used for the pipe type refrigerating apparatus and the panel type refrigerating apparatus in the present application example, it is not necessary to increase the sectional area of the heat transferring material for reducing the heat transfer resistance in the pipe type refrigerating apparatus, and, consequently the pipe type refrigerating apparatus with ⅔ of the weight ratio compared with the panel type refrigerating apparatus can provide the same capability, which is a feature of the pipe type refrigerating apparatus of the example of the present invention, Thus, since the pipe type refrigerating apparatus of the example of the present invention reduces the heat transfer resistance, and simultaneously, reduces the weight of the parts to be cooled by using the flow of refrigerant gas for heat transfer of a subject to be cooled, the apparatus can significantly increase the heat transfer characteristic as a synergy effect of these reductions.

INDUSTRIAL APPLICABILITY

With the regenerative refrigerating apparatus of the present invention, cooling and heating/regenerating a subject to be cooled can be accelerated in the heat utilization, thereby realizing efficient heat transfer. As a result, the utilization ratio of the refrigerating apparatus can significantly increase. Additionally, if an expansion piston (displacer) sliding during operation is used in a GM refrigerating apparatus as a type of the regenerative refrigerating apparatus of the present invention, the vibration generated by the refrigerating apparatus is not transmitted to a subject to be cooled. Consequently, since the apparatus does not adversely affect to sensors and semiconductor manufacturing apparatuses, the apparatus can be widely applied to these applications.

The invention claimed is:

1. A pulse tube refrigerating apparatus comprising:
   a pulse tube having a room temperature end and a low temperature end;
   a regenerator having a room temperature end and a low temperature end;
   a phase control means for communicating with said room temperature end of said pulse tube so as to control pressure fluctuation and phase difference of working gas;
   a pressure control means communicating with said room temperature end of said regenerator, and having a compressor, a high pressure selector valve and a low pressure selector valve; and
   a flow path for working gas connecting said low temperature end of said pulse tube and said low temperature end of said regenerator with each other,
   wherein said flow path is simultaneously extending to said subject to be cooled, thereby carrying out heat transfer to said subject to be cooled, said apparatus adapted to have a room temperature gas introduced into the flow path so as to enable the heating period of the subject to be cooled to be reduced during the cooling and heating/regenerating.

* * * * *